United States Patent
Nuzman

(10) Patent No.: US 10,069,533 B2
(45) Date of Patent: Sep. 4, 2018

(54) METHODS AND SYSTEMS FOR REDUCING CROSSTALK USING SEQUENTIAL NON-LINEAR VECTORING

(71) Applicant: Alcatel-Lucent USA Inc., Murray Hill, NJ (US)

(72) Inventor: Carl J. Nuzman, Union, NJ (US)

(73) Assignee: Nokia of America Corporation, Murray Hill, NJ (US)

(*) Notice: Subject to any disclaimer, the term of this patent is extended or adjusted under 35 U.S.C. 154(b) by 0 days.

(21) Appl. No.: 15/094,356

(22) Filed: Apr. 8, 2016

(65) Prior Publication Data
US 2017/0294940 A1    Oct. 12, 2017

(51) Int. Cl.
| | | |
|---|---|---|
| H03D 1/04 | (2006.01) | |
| H04B 3/32 | (2006.01) | |
| H04B 3/487 | (2015.01) | |
| H04M 11/06 | (2006.01) | |
| H04M 3/22 | (2006.01) | |
| H04M 3/30 | (2006.01) | |

(52) U.S. Cl.
CPC .............. H04B 3/32 (2013.01); H04B 3/487 (2015.01); *H04M 3/2209* (2013.01); *H04M 3/304* (2013.01); *H04M 11/062* (2013.01)

(58) Field of Classification Search
CPC ........................................................ H04B 3/32
USPC ............................................................. 375/346
See application file for complete search history.

(56) References Cited

U.S. PATENT DOCUMENTS

| | | | |
|---|---|---|---|
| 7,555,061 B2* | 6/2009 | Katagiri | H04B 10/505 359/279 |
| 2013/0188751 A1* | 7/2013 | Ohlmer | H04B 7/0417 375/296 |
| 2016/0226556 A1 | 8/2016 | Nuzman et al. | |

FOREIGN PATENT DOCUMENTS

EP    3032789 A1    6/2016

* cited by examiner

*Primary Examiner* — Lihong Yu
(74) *Attorney, Agent, or Firm* — Harness, Dickey & Pierce, P.L.C.

(57) ABSTRACT

In one example embodiment, a method includes determining a first set of first lines and a second set of second lines in a system, obtaining input signals to be transmitted over the first set of first lines and the second set of second lines, determining a vectoring matrix, processing, within the first set, the incoming signals for the first lines in parallel based on the vectoring matrix, processing, within the second set, the input signals for the second lines in parallel based on the vectoring matrix and processing the first set and the second set sequentially based on the vectoring matrix, the processing the second set being based on at least a portion of the processing the incoming signals for the first lines.

14 Claims, 7 Drawing Sheets

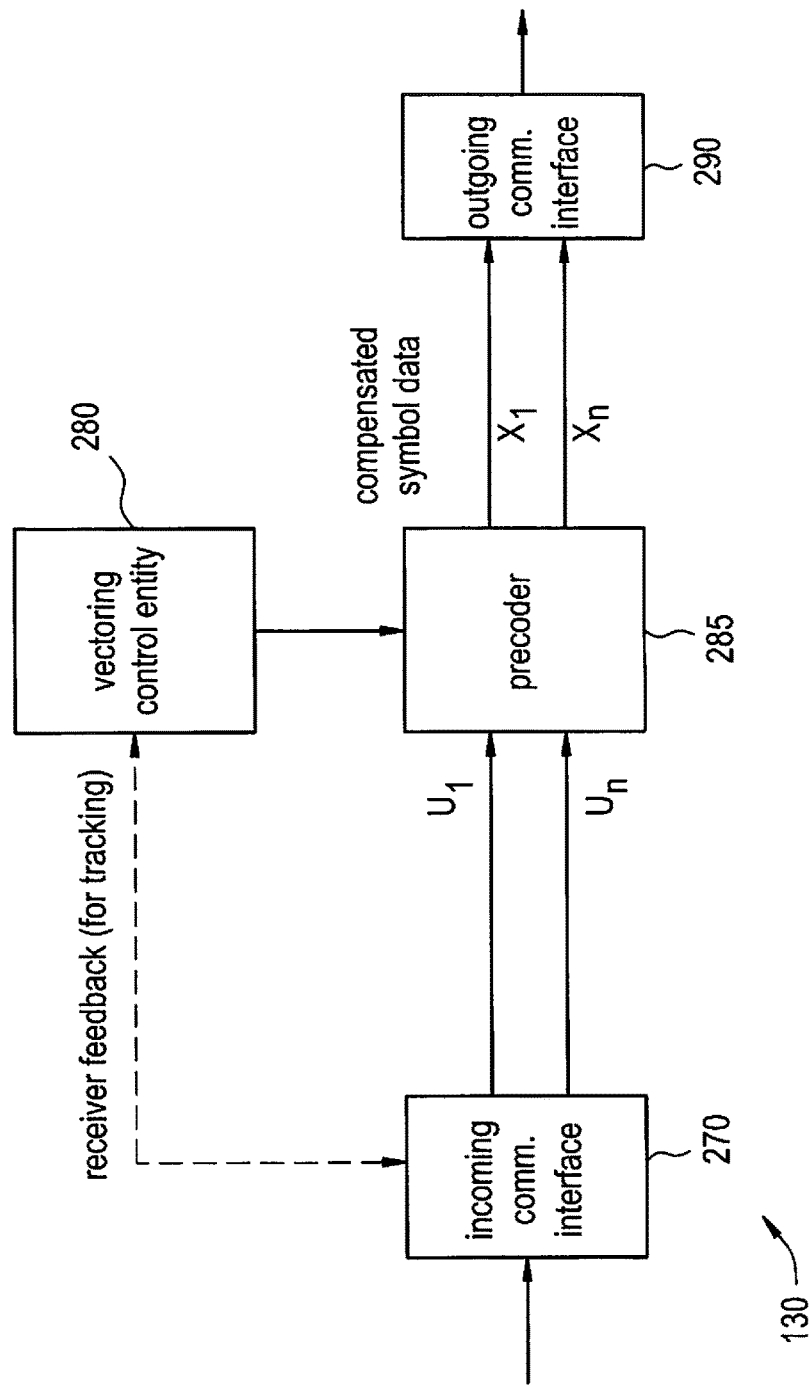

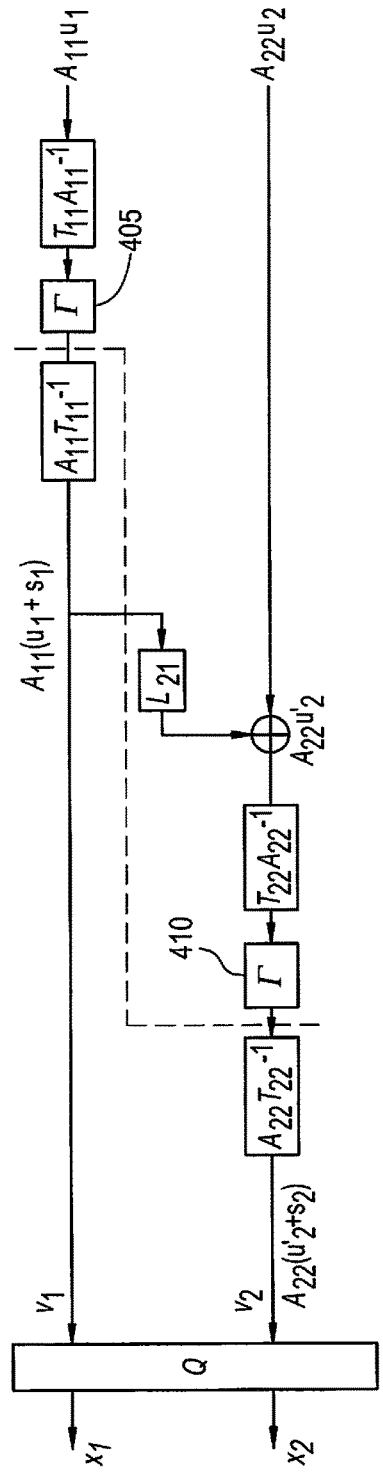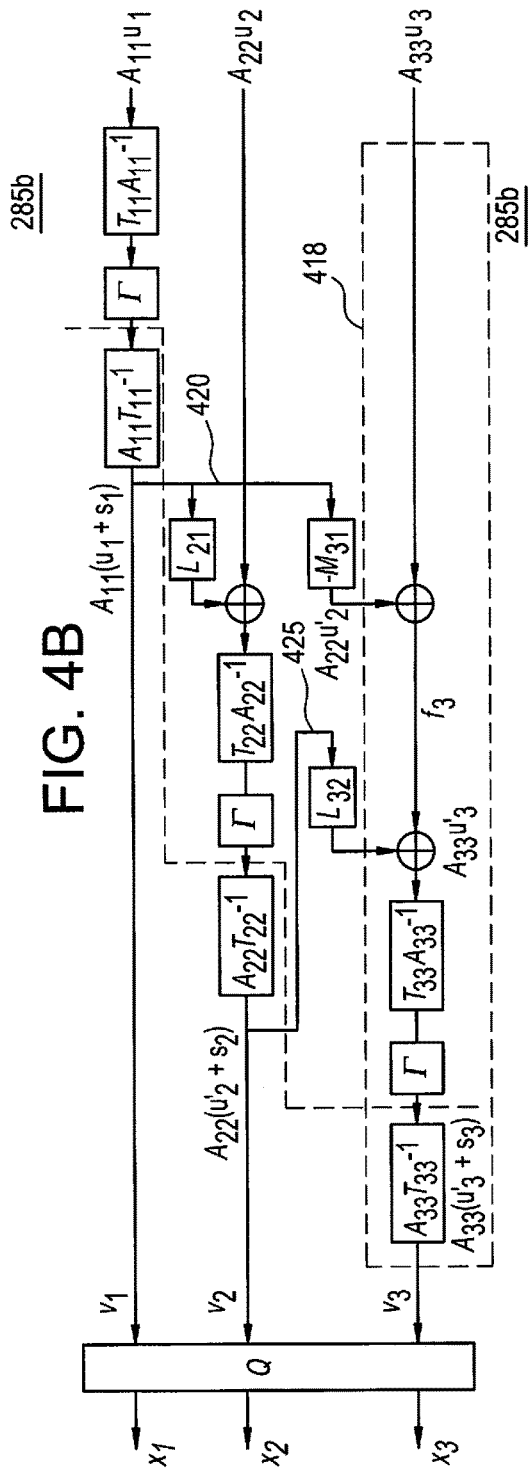

METHODS AND SYSTEMS FOR REDUCING CROSSTALK USING SEQUENTIAL NON-LINEAR VECTORING

BACKGROUND

Performance of a digital subscriber line (DSL) in terms of capacity depends on a number of factors such as attenuation and a noise environment. Performance of a DSL transmission system is impacted by crosstalk interference from one twisted line pair to another twisted line pair with the same binder and, to a lesser extent, twisted line pairs in neighboring binders.

Consequently, crosstalk interference may affect data rates across a number of twisted pair lines.

For instance two communication lines such as two very-high-bitrate digital subscriber line (VDSL2) lines which are collocated next to each other induce a signal in each other. Due to the induced crosstalk and noise from other sources in the surroundings of the communication line, the data transported on these lines may be affected or corrupted by the crosstalk and noise. By reducing the crosstalk induced on a communication line or compensating the crosstalk induced on a communication line, the amount of corrupted data may be reduced and the rate at which information can be reliably communicated is increased.

Existing solutions for reducing crosstalk and noise include vectoring. Vectoring refers to precoding (downstream) or postcoding (upstream) to cancel crosstalk between multiple twisted pair copper lines in a DSL access node.

Precoding (also referred to as precompensation) techniques are based on transmitting an additional signal added to the data signal which is used to compensate for the crosstalk on a victim line from external sources. Thus, instead of reducing the effect of crosstalk or avoiding crosstalk effects by configuring the communication line in an appropriate way, precoding can be used to compensate for the effects of crosstalk on a communication channel. Precoding techniques are based on crosstalk channel information that includes both amplitude and phase information. Such information can be obtained from measurements such as slicer error or signal-to-noise ratio (SNR). A particular example of such measurements for precoding is the use of pilot sequences and error feedback. The use of pilot sequences in G.vector is described in "Self-FEXT cancellation (vectoring) for use with VDSL2 transceivers," *Series G: Transmission Systems and Media, Digital Systems and Networks, ITU G.993.5*, April 2010, the entire contents of which is incorporated by reference.

In the context of providing data network access to homes and businesses, various technologies collectively known as FTTx have been used or proposed. In these technologies, data is conveyed from a network operator to an intermediate location using fiber optics, and data is conveyed from the intermediate location to the customer location using DSL transmission over twisted pair copper lines. The term FTTdp refers to a scenario in which the intermediate location is a "distribution point", serving up to a few dozen customers within a distance of less than 200 m. For example, G.fast is a transmission technology that uses time division duplexing (TDD) to duplex downstream and upstream transmission.

SUMMARY

Example embodiments are directed to methods and systems for reducing crosstalk in DSL systems with high levels of crosstalk.

Example embodiments disclose vectoring schemes that combine non-linear and linear vectoring techniques with a reduced number of sequential steps.

According to one example embodiment, a method includes determining a first set of first lines and a second set of second lines in a system, obtaining input signals to be transmitted over the first set of first lines and the second set of second lines, the second set of second lines including at least two lines, determining a vectoring matrix, processing, within the first set, the incoming signals for the first lines in parallel based on the vectoring matrix, processing, within the second set, the input signals for the second lines in parallel based on the vectoring matrix and processing the first set and the second set sequentially based on the vectoring matrix, the processing the second set being based on at least a portion of the processing the incoming signals for the first lines.

In an example embodiment, the determining the vectoring matrix includes determining a lattice reduction matrix, the lattice reduction matrix including a first sub-matrix associated with the first set of lines and a second sub-matrix associated with the second set of lines and determining a lower-diagonal matrix, the lower-diagonal matrix including a third sub-matrix associated with the first set of first lines and the second set of second lines, the lattice reduction matrix and the lower-diagonal matrix forming at least a part of the vectoring matrix.

In an example embodiment, the processing within the first set includes generating scaled shifted signals for the first lines based on the input signals for the first lines, the first sub-matrix and a rounding operator.

In an example embodiment, the method further includes generating a first precoded vector based on the scaled shifted signals and a scaling matrix.

In an example embodiment, the generating generates the first precoded vector by $$x_1 = Q_{11} A_{11}(u_1 + s_1) + Q_{12} A_{22}(u_2' + s_2)$$

where $x_1$ is the first precoded vector, Q is a block-orthogonal matrix and $Q_{11}$ and $Q_{12}$ are submatrices of the block-orthogonal matrix, $A_{11}$ is a fourth sub-matrix, the fourth sub-matrix being a sub-matrix of the scaling matrix, $A_{22}$ is a fifth sub-matrix, the fifth sub-matrix being a sub-matrix of the scaling matrix, $u_1$ is the input signals for the first lines, $s_1$ is the shifted signals for the first lines, $u_2'$ is modified input signals for the second lines and $s_2$ is shifted signals for the second lines.

In an example embodiment, the processing the first set and the second set sequentially includes generating feeding signals by applying the scaled shifted signals for the first lines to at least the third sub-matrix and adding the feeding signals to scaled input signals of the input signals for the second lines to generate modified input signals for the second lines.

In an example embodiment, the processing within the second set includes generating scaled shifted signals for the second lines based on the modified input signals for the second lines, the second sub-matrix and a scaling matrix.

In an example embodiment, the processing within the first set includes generating scaled shifted signals for the first lines based on the input signals for the first lines, the first sub-matrix and a modulo operator.

In an example embodiment, the method further includes generating a first precoded vector based on the scaled shifted signals for the first lines and a block-orthogonal matrix.

In an example embodiment, the processing within the second set includes generating modified scaled input signals for the second lines based on the second sub-matrix of the lattice reduction matrix and the input signals for the second lines.

In an example embodiment, the processing the first set and the second set sequentially includes generating feeding signals by applying the scaled shifted signals for the first lines to the third sub-matrix and adding the feeding signals to the scaled input signals for the second lines to generate the modified scaled input signals for the second lines.

In an example embodiment, the processing within the second set includes generating scaled shifted signals for the second lines based on the modified scaled input signals for the second lines and the modulo operator.

In an example embodiment, the lattice reduction matrix is a unimodular matrix other than an identity matrix.

At least one example embodiment discloses a method including determining a plurality of sets of lines, linearly vectoring incoming signals for a first set of the plurality of sets of lines, sequentially applying shifting vectors to incoming signals for the remaining plurality of sets of lines, at least one of the remaining plurality of sets of lines including at least two lines and generating vectored signals for the shifted incoming signals for the remaining plurality of sets of lines.

In an example embodiment, the generating the vectored signals includes applying a precoding matrix to the shifted incoming signals for the remaining plurality of sets of lines.

In an example embodiment, the generating the vectored signals includes applying a block-orthogonal matrix to the shifted incoming signals for the remaining plurality of sets of lines.

At least one example embodiment discloses a device including a processor configured to determine a plurality of sets of lines, linearly vector incoming signals for a first set of the plurality of sets of lines, sequentially apply shifting vectors to incoming signals for the remaining plurality of sets of lines, at least one of the remaining plurality of sets of lines including at least two lines and generate vectored signals for the shifted incoming signals for the remaining plurality of sets of lines.

At least another example embodiment discloses a device including a processor configured to determine a first set of first lines and a second set of second lines in a system, obtain input signals to be transmitted over the first set of first lines and the second set of second lines, the second set of second lines including at least two lines, determine a vectoring matrix, process, within the first set, the incoming signals for the first lines in parallel based on the vectoring matrix, process, within the second set, the input signals for the second lines in parallel based on the vectoring matrix and process the first set and the second set sequentially based on the vectoring matrix, the processing the second set being based on at least a portion of the processing the incoming signals for the first lines.

BRIEF DESCRIPTION OF THE DRAWINGS

Example embodiments will be more clearly understood from the following detailed description taken in conjunction with the accompanying drawings. FIGS. 1-6B represent non-limiting, example embodiments as described herein.

FIG. 1 illustrates a communication system, according to an example embodiment;

FIG. 2 illustrates a controller including a precoder, according to an example embodiment;

FIGS. 4A-4B illustrate precoders with modulo notation according to other example embodiments;

FIG. 5 illustrates a method of precoding according to an example embodiment; and FIGS. 6A-6B illustrate precoders according to other example embodiments.

DETAILED DESCRIPTION

Figure 1:
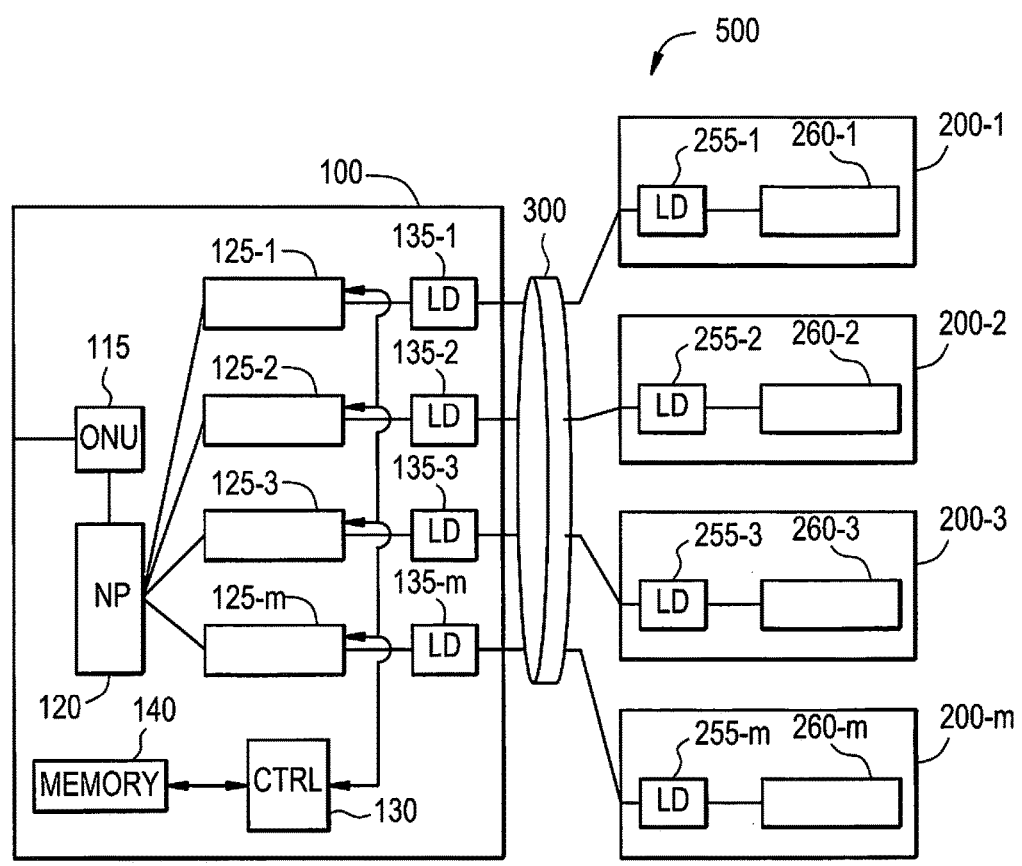

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium. The tangible storage medium may be magnetic (e.g., a floppy disk or a hard drive) or optical (e.g., a compact disk read only memory, or "CD ROM"), and may be read only or random access. Example embodiments are not limited by these aspects of any given implementation.

FIG. 1 illustrates a communication system, according to an example embodiment. As shown in FIG. 1, a system 500 includes a distribution point or access node 100 and Customer Premises Equipment (CPEs) 200-1 to 200-$m$, where m may be an integer greater than 1.

The access node 100 may be under control of an operator. The access node 100 includes an optical network unit (ONU) 115 configured to communicate with a network processor (NP) 120. As is known, the ONU 115 provides a high-bandwidth data connection over a fiber optic channel to an optical line terminal (OLT) located in a central office. The ONU 115 passes received downstream data frames or packets to the NP 120, which then determines the destination for the frames or packets and accordingly forwards them to an appropriate interface (e.g., DSL, ADSL, G.fast, VDSL2, etc. interface). Similarly, in the upstream direction, the NP 120 forwards frames or packets from the interfaces to the ONU 115.

The NP 120 provides signals to processing devices 125-1 to 125-$m$. The processing devices 125 are configured for point-to-point communication.

The access node 100 further includes a controller 130. The controller 130 is configured to receive signal data collectively referred to as a signal vector from the processing devices 125. The signal data may include signal values intended to be received by corresponding processing devices 260-1 to 260-$m$ in the CPEs 200. In the downstream direction, the controller 130 is also configured to precode the signal vector, and send the resulting data back to the processing devices 125 for transmission to the CPEs 200. The processing devices 125 then send the precoded signal data over respective lines 300 via respective analog front ends (AFEs) 135-1 to 135-$m$.

In the upstream direction, the processing devices 125 receive crosstalk-contaminated signals from the AFEs 135. The controller 130 receives the crosstalk-contaminated signals (collectively referred to as received signal vector) from the processing devices 125, postcodes the received signal vector, and provides the processing devices 125 with the postcompensated signal data. The processing devices 125 then continue to process the signal data to demodulate the intended upstream information.

Generally, the data exchanged between processing devices would be frequency-domain samples, but alternatively the data could be represented as time-domain samples, for example.

As discussed above, the controller 130 communicates with the processing devices 125. Alternatively, the controller 130 may be between the processing devices 125 and the AFEs 135-1 to 135-$m$. Thus, the location of the controller 130 is not limited to the location shown in FIG. 1.

Furthermore, it will be understood that the access node 100 may include a memory 140, or multiple memories. The NP 120, the controller 130, and/or the processing devices 125 execute programs and/or program modules stored on the memory 140 to perform their respective functions and the functions of the access node 100. The memories may be external to and/or internal to the NP 120, the controller 130, and/or the processing devices 125. For the purposes of simplicity of illustration only, only the memory 140 associated with the controller 130 is shown.

As discussed above, each of the processing devices 125 may communicate with a respective one of the CPEs 200 over the communication lines 300 through an associated AFE 135. The lines 300 (also referred to as links) may be telephone lines (e.g., twisted copper pairs), and the CPEs 200-1 to 200-$m$ may be modems or other interface devices operating according to a communication standard for transmitting data over telephone lines. The CPEs 200-1 to 200-$m$ may be located in various customer premises. Each of the CPEs 200-1 to 200-$m$ includes an AFE 255-1 to 255-$m$ and respective processing devices 260-1 to 260-$m$. Each of the AFEs 255 may be the same or substantially the same as the AFEs 135.

FIG. 2 illustrates the controller 130 including a precoder, according to an example embodiment. While FIG. 2 is described with reference to a precoder, it should be understood that the same structure applies to a postcoder. The controller 130 has a communication interface 270 with each of the processing devices 125-1 to 125-$m$. The incoming communication interface 270 receives data and control signals from the processing devices 125-1 to 125-$m$. The incoming communication interface 270 forwards symbol data $u_1$-$u_n$ from the respective processing devices 125-1 to 125-$m$ that are to be precoded to the precoder 285. While not illustrated, it should be understood that a subset selector may be present between the incoming communication interface 270 and the precoder 285, as described in U.S. application Ser. No. 14/609,657, entitled Methods and Systems for Reducing Crosstalk via Stabilized Vectoring Control, the entire contents of which are hereby incorporated by reference.

The processing devices 125-1 to 125-$m$ may maintain individual queues containing packets of information to be sent on each of the m lines. At any point in time, some queues may have packets waiting to be sent, while other queues are empty.

An active line may or may not have data to send. An active line without data to send is called an idle line. In a vectored system, all active idle lines send compensation signals generated by the precoder 285, regardless of whether they have data to send. The incoming communication interface 270 designates the active lines for transmission.

The incoming communication interface 270 determines a plurality of signal values $u_1$-$u_n$ (symbols) corresponding to the active lines.

In some systems, if there is no user data to send, the system fills in dummy data. In such systems all lines are always active and there is no subset selector.

The incoming communication interface 270 forwards the symbol data $u_1$-$u_n$ to a precoder 285.

The incoming communication interface 270 also forwards receiver feedback, such as crosstalk characteristics to a vectoring control entity (VCE) 280.

The crosstalk characteristics could be error feedback samples or DFT output samples collected by the receiver (the samples are then processed by correlation etc. to come up with estimates of crosstalk coefficients). Alternatively, the crosstalk characteristics could be estimates of crosstalk coefficients computed elsewhere and then forwarded to the VCE 280. Additionally, the crosstalk characteristics could be other forms of feedback, e.g., SNR measurements that are affected by crosstalk and can be used to learn something about the crosstalk.

The precoder 285 applies coefficients received from the VCE 280 to the symbol data received from the incoming communication interface 270 to produce compensated data symbols $x_1$-$x_n$ (precoded data), which are forwarded to an outgoing communication interface 290. The outgoing communication interface 290 sends the compensated data symbols to the processing devices 125-1 to 125-$m$, or to a subset of these devices. Additionally, the incoming communication interface 270 periodically receives receiver feedback data, which it forwards to the VCE 280.

In FIG. 2, the incoming communication interface 270, the precoder 285 and the outgoing communication interface 290 may be considered data path elements while the vectoring control entity 280 may be considered a control path element that instructs the data path elements what to do.

Each of the incoming communication interface 270, the precoder 285, the outgoing communication interface 290 and the vectoring control entity 280 may be implemented in hardware, a processor configured to execute software, firmware, or any combination thereof, for example. When at least one of the incoming communication interface 270, the precoder 285, the outgoing communication interface 290 and the vectoring control entity 280 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the at least one of the incoming communication interface 270, the precoder 285, the outgoing communication interface 290 and the vectoring control entity 280. CPUs, DSPs, ASICs and FPGAs may generally be referred to as processors and/or microprocessors.

In the event where at least one of the incoming communication interface 270, the precoder 285, the outgoing communication interface 290, and the vectoring control entity 280 is a processor executing software, the processor is configured as a special purpose machine to execute the software, stored in a storage medium (e.g., memory 140), to perform the functions of the at least one of the incoming communication interface 270, the precoder 285, the outgoing communication interface 290 and the vectoring control entity 280. In such an embodiment, the processor may include one or more Central Processing Units (CPUs), digital signal processors (DSPs), application-specific-integrated-circuits (ASICs), field programmable gate arrays (FPGAs) computers.

Non-linear vectoring techniques may give better performance than linear methods, especially for poorly conditioned channels. In particular, applying linear vectoring to poorly conditioned channels incurs a power penalty that effectively reduces signal power (downstream) or increases noise power (upstream). In other words, when a precoder matrix based on the inverse of a channel matrix would require large coefficients (due to the poorly conditioned channel), the precoder amplifies the power of the precoder input signal, and the power utilized for transmission would exceed a transmission power constraint. As a result, the input power must be reduced so that the output power meets the transmission power constraint. This required reduction can be referred to as a power penalty.

This power penalty can be reduced by non-linear techniques. Non-linear techniques generally involve linear stages interleaved with non-linear operations such as modulo and rounding. For example, a shift value (e.g., an integer multiple of a constellation width) may be added to data signals to be transmitted to reduce power resulting from a precoder. A shift value is added to the data signal for each user on each tone and the shifted signal is then precoded by a linear precoder. A receiver removes the shift value upon receiving the data signal, by applying a modulo operation.

Two conventional non-linear techniques include Tomlinson-Harishima Precoding (THP) and Lattice Reduction Precoding (LRP).

In THP, an N×N linear precoder P is decomposed into a product P=QL. In THP, Q is a unitary matrix and L is a lower-diagonal matrix. Input signals are propagated sequentially through each row of the lower-diagonal matrix L. A modulo operation is applied after each row, and the results are fed back to the calculation of the next row. Finally, the results are propagated through the Q matrix.

However, THP is difficult to implement because of the large number of sequential steps.

In LRP, an N×N linear precoder is decomposed into a product P=PT of a reduced precoder P' and a unimodular matrix T. The unimodular matrix T is chosen to improve the conditioning of P' relative to that of P, so that the reduced precoder P' has lower power penalty than the precoder P. LRP is implemented by multiplying an input data vector by the unimodular matrix T, applying a non-linear modulo operation to all vector components in parallel, and then multiplying by the reduced precoder P'.

However, LRP's sum-rate performance is not as high as that of THP.

Example embodiments disclose non-linear vectoring schemes that combine features of previous non-linear vectoring techniques to obtain a new technique that has better performance than the lattice-based schemes, but with fewer sequential steps.

While example embodiments are described below with respect to precoding (i.e., downstream), it should be understood example embodiments may be implemented in postcoding (i.e., upstream) as well.

In example embodiments, users are divided into $N_b$ blocks of users. The terms users and lines may be used interchangeably. The blocks are processed in $N_b$ sequential block-steps, in an overall flow sequence. Within each block step, all users in the block are processed in parallel, using the LRP technique.

Figure 3A:
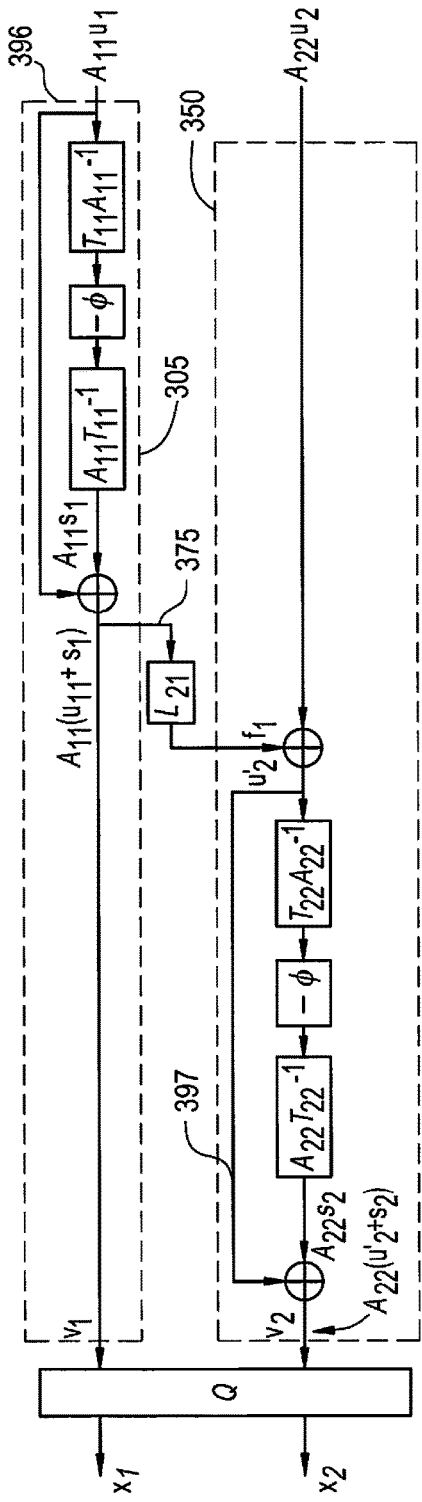
FIGS. 3A-3B illustrate precoders with rounding notation according to example embodiments.
Figure 3B:
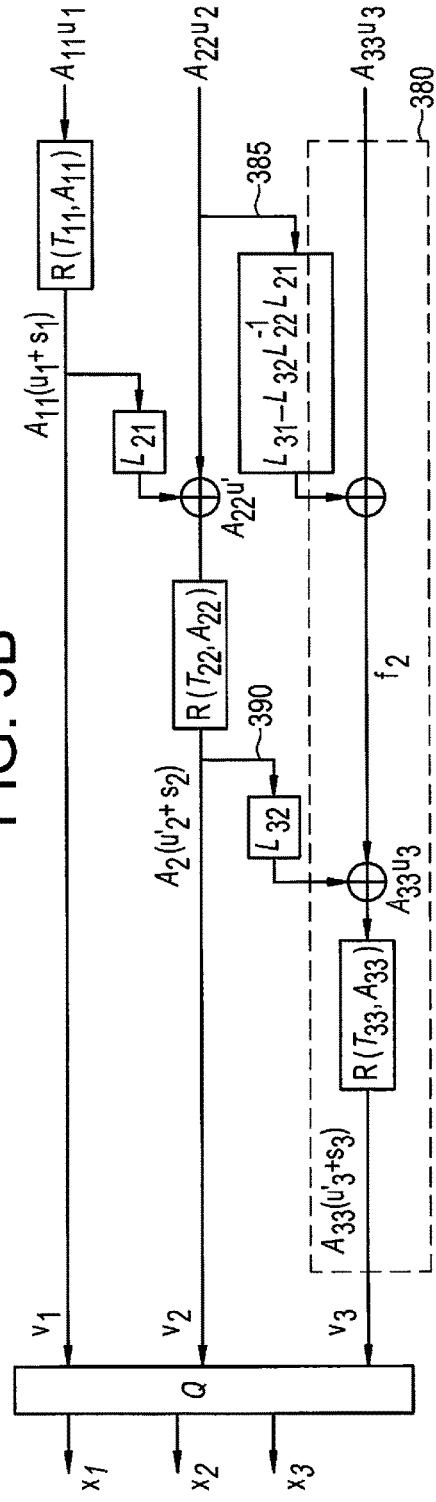

FIGS. 3A-3B illustrate precoders with rounding notation according to example embodiments.

As shown in FIG. 3A, a precoder 285a receives scaled incoming signals from users that are divided into first and second blocks with input (symbol data) $u_1$ and $u_2$, respectively, by the incoming communication interface 270.

The incoming communication interface 270 may determine the first and second blocks to improve performance, such as reducing the power penalty. For example, the incoming communication interface 270 may choose the blocks so that the correlations between channel rows of users assigned to the same block are low (e.g., a minimum value), while ensuring that users whose channel rows are strongly correlated to each other are placed into different blocks.

The precoder 285a performs parallel lattice reduction precoding for the channels 305 and 350. The precoder 285a processes the scaled incoming signals within the first block $A_{11}u_1$ in parallel using a channel 305 where $A_{11}$ is a submatrix corresponding to the input $u_1$ of a scaling matrix A. Similarly, the precoder 285a processes the scaled incoming signals within the second block $A_{22}u_2$ in parallel using a channel 375. Lastly, the precoder 285a processes first and second scaled input $A_{11}u_1$ and $A_{22}u_2$ using a feeding channel 375.

The input for the first and second blocks $u_1$ and $u_2$ may be of any size. In an example embodiment, the symbol data for the first and second blocks $u_1$ and $u_2$ are equal in size.

Given an N×N channel matrix H, the controller 130 determines a relative scaling matrix S' (for example, S'=diag{H} or S' is the THP scaling), the controller 130 calculates a zero-forcing reduced precoder P' as $$P' = H^{-1}S' \tag{1}$$

The controller 130 may reorder the users so that the columns of the precoder P' are in decreasing norm order, and then divide the users into the two blocks, where the first input $u_1$ is for users 1 through M/2, and the remaining users are in the second input block $u_2$, where M is the number of users. However, example embodiments are not limited to determining the blocks based on decreasing order.

The controller 130 block decomposes the reduced matrix P' as:

$$P' = QL = \begin{bmatrix} Q_{11} & Q_{12} \\ Q_{21} & Q_{22} \end{bmatrix} \begin{bmatrix} I & 0 \\ L_{21} & I \end{bmatrix} \tag{2}$$

where, in example embodiments, Q is a block-orthogonal matrix as opposed to a unitary matrix. Because the matrix Q is block-orthogonal, any column of the matrix Q from a block is orthogonal to any column of the matrix Q from any other block.

Subscripts for sub-matrices $Q_{11}$, $Q_{12}$, $Q_{21}$, $Q_{22}$, and $L_{21}$ correspond to the input for the block of users (e.g., 1 is for $u_1$ and 2 is for $u_2$). The same notation is used throughout the specification for other sub-matrices. In one example, the controller 130 may utilize block decomposition $$L_{11} = I, L_{22} = I, L_{11} = I, L_{22} = I, \tag{3}$$

$$L_{21} = -\left(\sum_k P_{k2}^H P_{k2}\right)^{-1}\left(\sum_k P_{k2}^H P_{k1}\right)$$

which results in the first input block $u_1$ columns of Q being orthogonal to the second input block $u_2$ columns of Q and where I is an identity matrix and k represents the block number, so that the sums in equation (3) are over the values k=1, 2.

The controller 130 applies block-wise lattice reduction to reduce the matrix Q as:

$$\bar{Q} = QT^{-1} = \begin{bmatrix} Q_{11} & Q_{12} \\ Q_{21} & Q_{22} \end{bmatrix} \begin{bmatrix} T_{11}^{-1} & 0 \\ 0 & T_{22}^{-1} \end{bmatrix} \tag{4}$$

where T is a unimodular matrix and $T_{kk}$ are submatrices where k=1, 2 indicates the first or second input block, $u_1$ or $u_2$.

In order to determine scaling matrices that ensure that the precoder output will satisfy power constraints, the controller 130 applies a blockwise lattice reduction to generate a reduced scaled matrix as follows:

$$\tilde{P} = QT^{-1}A = \begin{bmatrix} Q_{11} & Q_{12} \\ Q_{21} & Q_{22} \end{bmatrix} \begin{bmatrix} T_{11}^{-1} & 0 \\ 0 & T_{22}^{-1} \end{bmatrix} \begin{bmatrix} A_{11} & 0 \\ 0 & A_{22} \end{bmatrix} \tag{5}$$

The controller 130 applies the diagonal matrices $A_{11}$ and $A_{22}$ to ensure $\tilde{P}$ satisfies unit row norm constraints. This is because, when the non-linear precoder is operated as described below, input signals of unit power, the output signal have powers predicted by the row norms of $\tilde{P}$. More specifically, the controller 130 must also ensure that a scaling matrix A is such that:

$$AT = TA \tag{6}$$

For example, the scaling matrix A will satisfy equation (6) if for each block j with Tjj=I, Ajj is an arbitrary diagonal matrix, and for each block j with Tjj not equal to I, $A_{ij}=a_j$ I, i.e., Ajj is a flat multiple of an identity matrix.

When the precoder operates as described in FIG. 3A, the effective linear precoder becomes:

$$P = H^{-1}SA = QLA \tag{7}$$

In other words, the precoder output x given precoder input u will be x=P(u+s), where s is a shift vector derived from u via a non-linear mapping. The power of x however will be the same as a linearly generated vector $\tilde{x} = \tilde{P}u$ would have.

The effect of sequential non-linear processing between blocks (block THP) in reducing the power penalty, relative to a linear system with precoder P, is indicated by the fact that $L_{21}$ does not appear in the expression for the reduced matrix $\tilde{P}$. The effect of parallel non-linear processing within blocks in reducing the power penalty, relative to a linear system with precoder P, is indicated by the presence of the T operator in the expression for the reduced matrix $\tilde{P}$.

The lower the power penalty, the larger the scaling matrix A can be, and the higher the final data rate.

Once these matrices have been determined by the controller 130, then the precoder 285a operates as shown in FIG. 3A. The precoder 285a processes the first input $u_1$ in parallel using channel 305. The precoder 285a initially scales the input $u_1$ and $u_2$ by corresponding sub-matrices of the scaling matrix A. More specifically, the precoder 285a multiplies the input $u_1$ by the sub-matrix $A_{11}$. However, it should be understood the multiplication may be performed by the processing device 125. Thus, the input to the precoder 285a would be Au.

The precoder 285a then multiplies $A_{11}u_1$ by $T_{11}A_{11}^{-1}$, applies a rounding operator $\Phi$ to each element of the product of the scaled signals for the first input block $A_{11}u_1$ and $T_{11}A_{11}^{-1}$, inverts the sign of the result, and then multiplies the output of the rounding operator $-\Phi$ by $A_{11}T_{11}^{-1}$ to generate a scaled shifting vector $A_{11}s_1$, where the rounding operator is $$\Phi(x)=\text{integer nearest to } x. \tag{8}$$

The precoder 285a generates shifted signals for the first input block $u_1$ by adding the scaled incoming signals for the first input block $A_{11}u_1$ to a scaled shifting vector $A_{11}s_1$, which results in a vector $v_1$.

The precoder 285a processes the incoming signals within the second input block $u_2$ in parallel using the channel 350 and in a sequential manner using the feeding channel 375.

In the feeding channel 375, the precoder 285a multiplies the shifted signals $A_{11}(u_1+s_1)$ by sub-matrix $L_{21}$ of the matrix L to generate feeding signals $f_1$. The precoder adds the scaled incoming signals for the second input block $A_{22}u_2$ to the feeding signals $f_1$ to generate modified input $u_2'$. The precoder 285a multiplies the modified input $u_2'$ by $T_{22}A_{22}^{-1}$, applies the product of the modified incoming signals $u_2'$ and $T_{22}A_{22}^{-1}$ to the rounding operator $-\phi$, and then multiplies the value from the application of the rounding operator $-\phi$ by $A_{22}T_{22}^{-1}$ to generate a scaled shifting vector $A_{22}s_2$.

The precoder 285a generates shifted signals for the second input block $u_2$ by adding the modified input $u_2'$ to the scaled shifting vector $A_{22}s_2$, which results in a vector $v_2$ ($A_{22}(u_2'+s_2)$).

The precoder 285a hence determines the vectors $v_1$ and $v_2$ as:

$$v_1=A_{11}(u_1+s_1) \tag{8}$$

$$v_2=A_{22}(u'_2+s_2)=A_{22}(u_2+s_2)+L_{21}A_{11}(u_1+s_1) \tag{9}$$

The vectors $v_1$ and $v_2$ are applied to the block-orthogonal matrix Q to generate precoded vectors $x_1$ and $x_2$.

As shown in the right side of equations (8) and (9), the vectors $v_1$ and $v_2$ satisfy v=LA(u+s) (shown below). Thus, the precoder 285a determines the precoded vectors as:

$$x=Qv=QLA(u+s)=P(u+s) \tag{10}$$

where s is the shift for the block of users.

Thus, $x_1$ is:

$$x_1=Q_{11}A_{11}(u_1+s_1)+Q_{12}A_{22}(u_2'+s_2) \tag{11}$$

Thus, a received vector of the line drivers 255-1-255-m is:

$$y=\Gamma(S^{-1}A^{-1}(Hx+z))=\Gamma(S^{-1}A^{-1}(HP(u+s)+z))=\Gamma(u+s+S^{-1}A^{-1}z)=\Gamma(u+S^{-1}A^{-1}z) \tag{12}$$

where $\Gamma$ is an operator that can be defined as:

$$\Gamma(x)=x-\phi(x) \tag{13}$$

FIG. 3B illustrates an example embodiment having three input blocks $u_1$, $u_2$ and $u_3$ for three blocks of users. The precoder 285a precodes the incoming signals for the input blocks $u_1$ and $u_2$ as described in FIG. 3A.

With respect to incoming signals for the third input block $u_3$, the precoder 285a determines a vector $v_3$ as follows:

$$v_3=A_{33}L_{33}(u_3'+s_3) \tag{14}$$

where $u_3'$ is modified input signals for the third block and $s_3$ is shifted signals for the third block.

In FIG. 3B, R is a lattice reduction shift operator:

$$R(T,A;x)=x-AT^{-1}\phi(TA^{-1}x)=AT^{-1}\Gamma(TA^{-1}x) \tag{15}$$

In FIG. 3B, the precoder 285a processes the third input block $u_3$ in parallel using channel 380 and feeding channels 385 and 390. The precoder 285a initially scales the input $u_3$ by a corresponding sub-matrix of the scaling matrix A, $A_{33}$. More specifically, the precoder 285a multiplies the third input block $u_3$ by the sub-matrix $A_{33}$. The precoder 285a then adds $A_{33}u_{33}$ to $(L_{31}-L_{32}L_{22}^{-1}L_{21})$ $((A_{11}(u_1+s_1))$ from the feeding channel 385, resulting in a vector $f_2$. The precoder 285a then adds vector $f_2$ to $(L_{32})((A_{22}(u_2'+s_2))$ to generate modified shifted signals $A_{33}u_3'$. Lastly, the precoder 285 applies the lattice reduction shift operator $R(T_{33}, A_{33})$, which results in a vector $v_3$ ($A_{33}(u_3'+s_3)$).

FIGS. 4A-4B illustrate a precoder with modulo notation according to example embodiments.

The operator $\Gamma$ may be considered a "centered modulo" that maps each element of a vector u to the interval $[-\frac{1}{2}, \frac{1}{2}]$ by integer shifts. For complex vectors, this operation is performed independently to the real and imaginary components. As can be seen FIG. 4A, there are two sequential batches of blockwise parallel non-linear operations.

The precoder 285b, shown in FIG. 4A is similar to the precoder 285a, shown in in FIG. 3A. Thus, only the differences will be described. In the precoder 285b, modulo operators 405 and 410 are used instead of the rounding operator $\phi$ and summing channels 396 and 397.

In FIG. 4A, a modulo output indicated by dashed red line is approximately a unit uniform distribution. Hence power of precoder output is determined by $QAT^{-1}$. Since A was chosen to commute with T, this can further be written as:

$$QAT^{-1}=QT^{-1}A=\overline{Q}A \tag{16}$$

In an example embodiment, $\overline{Q}A$ is stored as a single matrix in the memory 140. However, example embodiments are not limited thereto. For example, once the scaling matrix A is determined, the scaling matrix A can be stored in the memory 140.

FIG. 4B illustrates an example embodiment having the three input blocks $u_1$, $u_2$ and $u_3$. The precoder 285b utilizes an inverse of the matrix L.

More specifically, the controller 130 implements the matrix L as:

$$L = \begin{bmatrix} I & 0 & 0 & 0 \\ L_{21} & I & 0 & 0 \\ L_{31} & L_{32} & I & 0 \\ L_{41} & L_{42} & L_{43} & I \end{bmatrix} \tag{17}$$

The controller 130 may determine an inverse matrix $L^{-1}$ as:

$$L^{-1} = M = \begin{bmatrix} I & 0 & 0 & 0 \\ M_{21} & I & 0 & 0 \\ M_{31} & M_{32} & I & 0 \\ M_{41} & M_{42} & M_{43} & I \end{bmatrix} \quad (18)$$

More specifically, the controller 130 may obtain the matrix M by block-wise back-substitution going down the columns as shown below:

$$M_{rc} = -L_{rc} - \sum_{j=c+1}^{r-1} L_{rj} M_{jc} \quad (19)$$

where M decomposes into:

$$M = \begin{bmatrix} I & 0 & 0 & 0 \\ M_{21} & I & 0 & 0 \\ M_{31} & M_{32} & I & 0 \\ M_{41} & M_{42} & M_{43} & I \end{bmatrix} = \begin{bmatrix} I & 0 & 0 & 0 \\ M_{21} & I & 0 & 0 \\ M_{31} & 0 & I & 0 \\ M_{41} & 0 & 0 & I \end{bmatrix} \begin{bmatrix} I & 0 & 0 & 0 \\ 0 & I & 0 & 0 \\ 0 & M_{32} & I & 0 \\ 0 & M_{42} & 0 & I \end{bmatrix} \quad (20)$$

$$\begin{bmatrix} I & 0 & 0 & 0 \\ 0 & I & 0 & 0 \\ 0 & 0 & I & 0 \\ 0 & 0 & M_{43} & I \end{bmatrix}$$

Using the matrix M, the controller may determine the matrix L as:

$$L = M^{-1} = \begin{bmatrix} I & 0 & 0 & 0 \\ 0 & I & 0 & 0 \\ 0 & 0 & I & 0 \\ 0 & 0 & -M_{43} & I \end{bmatrix} \begin{bmatrix} I & 0 & 0 & 0 \\ 0 & I & 0 & 0 \\ 0 & -M_{32} & I & 0 \\ 0 & -M_{42} & 0 & I \end{bmatrix} \begin{bmatrix} I & 0 & 0 & 0 \\ -M_{21} & I & 0 & 0 \\ -M_{31} & 0 & I & 0 \\ -M_{41} & 0 & 0 & I \end{bmatrix} \quad (21)$$

The precoder 285b precodes the incoming signals for the input blocks $u_1$ and $u_2$ as described in FIG. 4A.

In FIG. 4B, the precoder 285b processes the third input block $u_3$ in parallel using channel 418 and feeding channels 420 and 425. The precoder 285b initially scales the third input block $u_3$ by a corresponding sub-matrix of the scaling matrix A, $A_{33}$. More specifically, the precoder 285b multiplies the third input block $u_3$ by the sub-matrix $A_{33}$. The precoder 285b then adds $A_{33}u_3$ to $(-M_{31})(A_{11}(u_1+s_1))$ from the feeding channel 420, resulting in a vector $f_3$. The precoder 285b then adds the vector $f_3$ to $(L_{32})((A_{22}(u_2'+s_2))$ to generate modified shifted signals $A_{33}u_3'$. Lastly, the precoder 285b multiplies $A_{33}u_3'$ by $T_{33}A_{33}^{-1}$, applies the modulo operator $\Gamma$ to each element of the product of the scaled signals for the input block $A_{33}u_3'$ and the $T_{33}A_{33}^{-1}$, and then multiplies the output of the modulo operator $\Gamma$ by $A_{33}T_{33}^{-1}$ to generate a scaled shifting vector $v_3=(A_{33}(u_3'+s_3))$.

The precoder 285b applies the vectors $v_1$-$v_3$ to the block-orthogonal matrix Q in the same manner as previously described.

The controller 130 may store the coefficients of L or M, and Q (e.g., in memory 140), which are smooth functions of frequency, separate from the coefficients of T, which are integer valued with discrete jumps.

Figure 5:
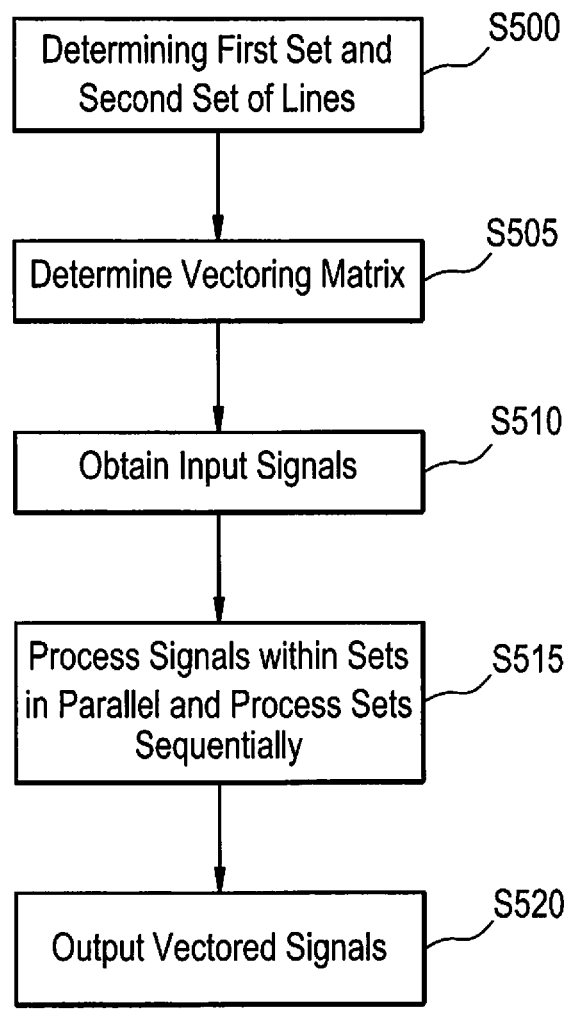

FIG. 5 illustrates a method of precoding according to an example embodiment. At S500, the controller 130 determines sets of lines such the groups of lines associated with input signals $u_1$-$u_3$, as described above. At S505, the controller 130 determines a vectoring matrix (i.e., the precoder P). The controller 130 obtains an estimate of the channel matrix H, and then performs off-line or control-path processing to determine the matrices Q, L, A and T. At S510, the controller 130 receives the input signals $u_1$-$u_3$. The precoder 285 processes the input signals $u_1$-$u_3$ in parallel with their associated groups (e.g., all elements of the $u_1$ signal processed in parallel) and the precoder 285 processes the sets sequentially (e.g., processing of the signals u2 is based on the processing of the signals u1 using the feeding channel 375). At S520, the controller 130 outputs the vectored signals x. S510-S520 may be considered an "on-line" or a "data-path" phase, in which symbol data u are received, processed via the vectoring matrices, and processed data signals x are generated. It should be understood that that once the vectoring matrix is determined, the controller 130 may keep the vectoring matrix for many different data signals and may update the vectoring matrix when the channel matrix H changes significantly (e.g., when new lines become active or active lines become inactive).

Figure 6A:
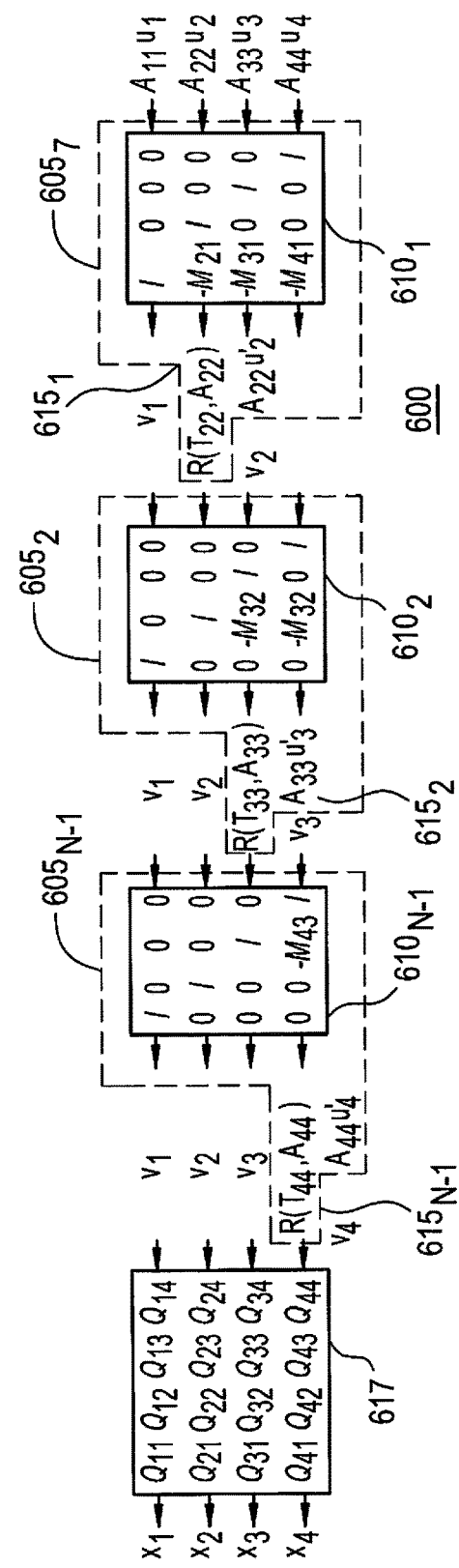
Figure 6B:
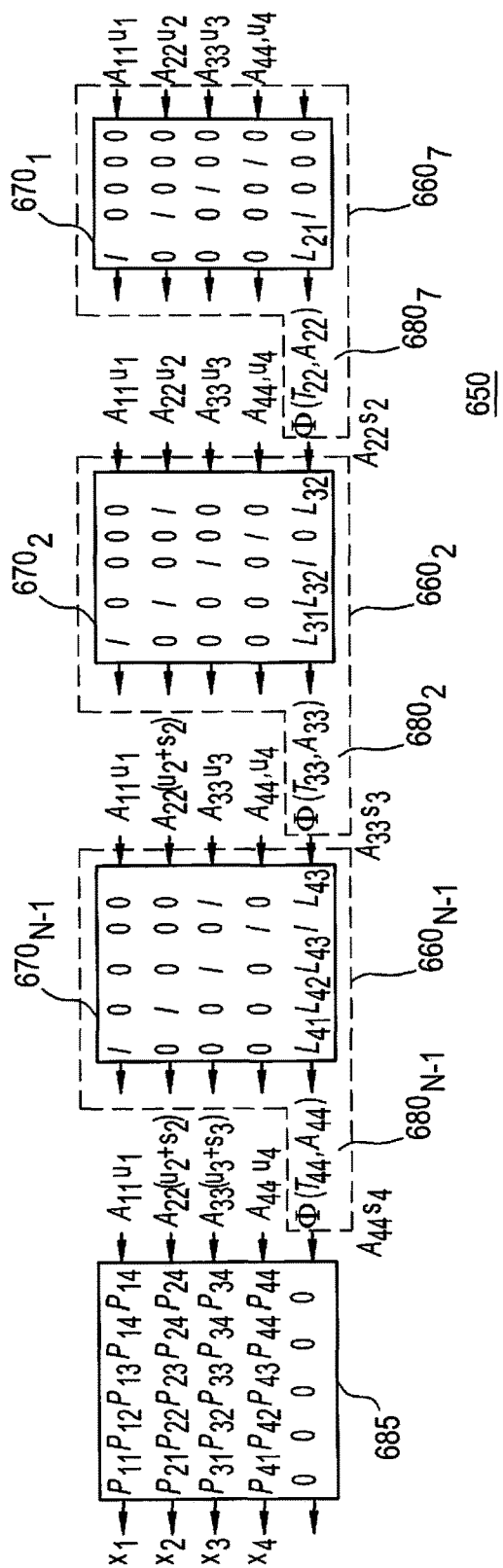

FIGS. 6A-6B illustrate precoders according to other example embodiments. FIG. 6A illustrates a systematic way of implementing the precoder 285b, shown in FIGS. 4A-B. FIG. 6B illustrates a systematic way of implementing FIGS. 3A-3B using a cascaded structure.

In the example embodiments of FIGS. 6A-6B, precoders 600 and 620 use building blocks.

As shown in FIG. 6A, the precoder 600 includes blocks $605_1$, $605_2$ and $605_{N-1}$ arranged in a sequential manner for N groups of users. That is, outputs from the block $605_1$ are inputs to the block $605_2$ and outputs of the block $605_2$ and inputs to the block $605_{N-1}$.

Each block $605_n$ is a hardware module that includes a linear portion $610_n$ and a non-linear portion $615_n$. The non-linear portion 615 is a modulo function R(T,A).

While only three blocks are illustrated, it should be understood that for N groups of users, the precoder 600 may include N−1 hardware modules including a linear portion and a non-linear portion and a final linear hardware module (e.g., block 617). Each hardware module may be a sub-circuit of an ASIC. The signals flow from one sub-circuit to another sequentially in time and space. Alternatively, a single sub-circuit of the ASIC may be used for each hardware module. As a result, the single sub-circuit would be reused multiple times such that the output is fed back to the input, with some delay.

As discussed above, the controller 130 block decomposes the precoder P as P=QLA. Thus, a precoded vector x is x=QLA(u+s), as shown in equation (10).

As shown in FIG. 6A, there are four input blocks $u_1$, $u_2$, $u_3$ and $u_4$ for four blocks of users.

As can be seen in FIG. 6A, the linear blocks $610_1$-$610_{N-1}$ are the three matrices in the matrix decomposition of the matrix L shown above in equation (21). Each linear block $610_1$-$610_{N-1}$ applies N×N matrix multiplication. Each of the non-linear portions $615_1$-$615_{N-1}$ is a W×W block-shift module, where the number of users in each of the groups $u_2$-$u_4$ should not exceed W.

The precoder 600 linearly precodes the scaled input block $A_{11}u_1$ such that it is not subject to one of the non-linear portions $615_1$, $615_2$ and $615_{N-1}$.

Similar the example embodiments described in FIGS. 3A-4B, the input signals for blocks $u_1$, $u_2$, $u_3$ and $u_4$ are processed in parallel within the input signals for blocks $u_1$, $u_2$, $u_3$ and $u_4$. Moreover, the input signals for blocks $u_2$, $u_3$ and $u_4$ are shifted in a sequential manner.

More specifically, the precoder 600 applies the first linear portion 610a to the scaled input signals for blocks of users $A_{11}u_1$, $A_{22}u_2$, $A_{33}u_3$ and $A_{44}u_4$, producing $v_1$, $A_{22}u'_2$, and partial sums of $A_{33}u'_3$ and $A_{44}u'_4$. The first non-linear portion $615_1$ shifts the incoming shifted signals $A_{22}u_2$ after being processed by the first linear portion $610_1$ by applying $R(T_{22},A_{22})$, resulting in the vector $v_2$. Remaining outputs of the block $605_1$ may be referred to as partial sums. For example, the fourth block output contains pieces that are gradually added together until they produce $A_{44}u'_4$.

At the block $605_2$, the shifted signals $v_1$, $v_2$ and the partial sums of $A_{33}u'_3$ and $A_{44}u'_4$ are linearly processed by the linear portion $610_2$ to produce $v_1$, $v_2$, $A_{33}u_3$ and a further partial sum of $A_{44}u'_4$. Furthermore, the second non-linear portion $615_2$ shifts the signal $A_{33}u'_3$ after being processed by the second linear portion $610_2$ by applying $R(T_{33},A_{33})$ to produce $V_3$. Thus, the output of the second block $605_2$ and the input for the third block $605_{N-1}$ include $v_1$, $v_2$ and $v_3$, and a further partial sum of $A_{44}u_4$.

At the block $605_{N-1}$, the vectors $v_1$, $v_2$ and $v_3$ and the further partial sum of $A_{44}u'_4$ are linearly processed by the linear portion $610_{N-1}$ to produce $v_1$, $v_2$, $V_3$, and $A_{44}u'_4$. Furthermore, the third non-linear portion $615_{N-1}$ shifts the signals $A_{44}u'_4$ by applying $R(T_{44},A_{44})$ to produce $v_4$. Thus, the output of the third block $605_{N-1}$ and an input for a block-orthogonal matrix 617 are vectors $v_1$-$v_4$.

The precoder 600 applies the block-orthogonal matrix 617 to the vectors $v_1$-$v_4$ to generate precoded vectors $x_1$, $x_2$, $x_3$ and $x_4$. While the example shown in FIG. 6A uses a block-orthogonal matrix such as that obtained by the block decomposition shown in equation (3), example embodiments are not limited thereto.

FIG. 6B illustrates a precoder according to another example embodiment. As shown, the precoder includes N−1 blocks $660_1$-$660_{N-1}$ arranged in a sequential manner for N groups of users for a total of U users. That is, outputs from the block 660 are inputs to the block $660_2$ and outputs of the block $660_2$ and inputs to the block $660_{N-1}$.

Each block 660n is a hardware module includes a linear portion 670n and a non-linear portion 680n. The size of the non-linear portions $680_1$-$680_{N-1}$ are dependent on the number of users J in the groups $u_2$-$u_4$, respectively.

The number of users associated with each of the input blocks $u_2$-$u_4$ does not have to be equal. If the number of users are not equal, then the total size of the linear blocks $670_1$-$670_{N-1}$ are not equal. Each hardware module may handle any linear matrix up to a maximum size. Thus, the input blocks $u_2$-$u_4$ can be in any size as long as $670_1$-$670_{N-1}$ do not exceed the maximum size. Moreover, the non-linear portions 680n may not exceed an associated maximum size. The size is determined by the block size, however, the hardware as having the capability to do a non-linear operation on a certain maximum number of elements, and the block sizes should not exceed that limit.

Thus, each of the blocks $660_1$-$660_{N-1}$ includes a (U+J)×(U+J) matrix multiplication at the linear portions $670_1$-$670_{N-1}$, respectively, followed by a J×J block-shift at the non-linear portions $680_1$-$680_{N-1}$, respectively.

While only three blocks are illustrated, it should be understood that for N groups of uses, the precoder 600 may include N−1 hardware modules including a linear portion and a non-linear portion, followed by a final linear hardware module (e.g., linear precoder 685).

For a group of users j, the controller 130 utilizes $\Phi(T_{jj}, A_{jj})$, respectively, which generates a shift vector. Given an input vector a, $\Phi(T_{jj},A_{jj})$ calculates the output $b=-A_{jj}T_{jj}^{-1}\Phi(T_{jj}A_{jj}^{-1}(a))$. That is, it multiplies the input by $T_{jj}^{-1}A_{jj}^{-1}$, applies a rounding operation to each element of the result, and then multiplies the rounded result by $-A_{jj}T_{jj}^{-1}$.

More specifically, the precoder 650 linearly precodes the first block of users with scaled input $A_{11}u_1$. In other words, the first block of users with scaled input $A_{11}u_1$ is precoded without a shift vector. Shift vectors $s_2$, $s_3$, $s_4$ are calculated sequentially by the non-linear portions $680_1$-$680_{N-1}$, respectively and stored with corresponding $u_k$, before final multiplication by the linear precoder 685.

An advantage of structures shown in FIGS. 6A-6B is that a hardware module can do a large linear multiplication followed by applying a non-linear operation to a subset of the outputs of the linear operation. This is helpful for hardware design because one can design generic modules that can be put together in different ways depending on the system size, etc. In addition, example embodiments may be realized in some cases by using a single hardware multiple times, feeding the output back to the input each time.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

The invention claimed is:

1. A method comprising:
   determining a first set of first lines and a second set of second lines in a system;
   obtaining input signals to be transmitted over the first set of first lines and the second set of second lines, the second set of second lines including at least two lines;
   obtaining a channel;
   determining a vectoring matrix based on the channel;
   processing, within the first set, the input signals for the first lines in parallel based on the vectoring matrix, the processing within the first set including a first linear matrix operation and a first non-linear operation;
   processing, within the second set, the input signals for the second lines in parallel based on the vectoring matrix, the processing within the second set including a second linear matrix operation and a second non-linear operation; and
   processing the first set and the second set sequentially based on the vectoring matrix, the processing the second set being based on at least a portion of the processing the input signals for the first lines.

2. A method comprising:
   determining a first set of first lines and a second set of second lines in a system;
   obtaining input signals to be transmitted over the first set of first lines and the second set of second lines, the second set of second lines including at least two lines;
   determining a vectoring matrix;
   processing, within the first set, the input signals for the first lines in parallel based on the vectoring matrix;
   processing, within the second set, the input signals for the second lines in parallel based on the vectoring matrix; and
   processing the first set and the second set sequentially based on the vectoring matrix, the processing the second set being based on at least a portion of the processing the input signals for the first lines, wherein the determining the vectoring matrix includes, determining a lattice reduction matrix, the lattice reduction matrix including a first sub-matrix associated with the first set of first lines and a second sub-matrix associated with the second set of second lines; and determining a lower-diagonal matrix, the lower-diagonal matrix including a third sub-matrix associated with the first set of first lines and the second set of second lines, the lattice reduction matrix and the lower-diagonal matrix forming at least a part of the vectoring matrix.

3. The method of claim 2, wherein the processing within the first set includes, generating scaled shifted signals for the first lines based on the input signals for the first lines, the first sub-matrix and a rounding operator.

4. The method of claim 3, further comprising:

generating a first precoded vector based on the scaled shifted signals and a scaling matrix.

5. The method of claim 4, wherein the generating the first precoded vector includes generating the first precoded vector by $$x_1 = Q_{11}A_{11}(u_1+s_1) + Q_{12}A_{22}(u_2'+s_2)$$

where $x_1$ is the first precoded vector, Q is a block-orthogonal matrix and $Q_{11}$ and $Q_{12}$ are submatrices of the block-orthogonal matrix, $A_{11}$ is a fourth sub-matrix, the fourth sub-matrix being a sub-matrix of the scaling matrix, $A_{22}$ is a fifth sub-matrix, the fifth sub-matrix being a sub-matrix of the scaling matrix, $u_1$ is the input signals for the first lines, $s_1$ is shifted signals for the first lines, $u_2'$ is modified input signals for the second lines and $s_2$ is shifted signals for the second lines.

6. The method of claim 3, wherein the processing the first set and the second set sequentially includes, generating feeding signals by applying the scaled shifted signals for the first lines to at least the third sub-matrix; and adding the feeding signals to scaled input signals of the input signals for the second lines to generate modified input signals for the second lines.

7. The method of claim 6, wherein the processing within the second set includes, generating scaled shifted signals for the second lines based on the modified input signals for the second lines, the second sub-matrix and a scaling matrix.

8. The method of claim 2, wherein the processing within the first set includes, generating scaled shifted signals for the first lines based on the input signals for the first lines, the first sub-matrix and a modulo operator.

9. The method of claim 8, further comprising:

generating a first precoded vector based on the scaled shifted signals for the first lines and a block-orthogonal matrix.

10. The method of claim 8, wherein the processing within the second set includes, generating modified scaled input signals for the second lines based on the second sub-matrix of the lattice reduction matrix and the input signals for the second lines.

11. The method of claim 10, wherein the processing the first set and the second set sequentially includes, generating feeding signals by applying the scaled shifted signals for the first lines to the third sub-matrix; and adding the feeding signals to scaled input signals for the second lines to generate the modified scaled input signals for the second lines.

12. The method of claim 11, wherein the processing within the second set includes, generating scaled shifted signals for the second lines based on the modified scaled input signals for the second lines and the modulo operator.

13. The method of claim 2, wherein the lattice reduction matrix is a unimodular matrix other than an identity matrix.

14. A device comprising:

a memory storing computer readable instructions; and a processor configured to execute the computer readable instructions to, determine a first set of first lines and a second set of second lines in a system;

obtain input signals to be transmitted over the first set of first lines and the second set of second lines, the second set of second lines including at least two lines;

obtain a channel;

determine a vectoring matrix based on the channel;

process, within the first set, the input signals for the first lines in parallel based on the vectoring matrix, the processor configured to execute the computer readable instructions to perform a first linear matrix operation and a first non-linear operation to process the input signals for the first lines;

process, within the second set, the input signals for the second lines in parallel based on the vectoring matrix, the processor configured to execute the computer readable instructions to perform a second linear matrix operation and a second non-linear operation to process the input signals for the second lines; and process the first set and the second set sequentially based on the vectoring matrix, the processing the second set being based on at least a portion of the processing the input signals for the first lines.

* * * * *